Dec. 13, 1927.  
W. H. FLEMING  
VALVE STEM RIM NUT  
Filed June 7, 1926

1,652,169

INVENTOR:  
Walter H. Fleming  
BY David E. Carlsen  
ATTORNEY.

Patented Dec. 13, 1927.

1,652,169

UNITED STATES PATENT OFFICE.

WALTER H. FLEMING, OF LUCK, WISCONSIN.

VALVE-STEM RIM NUT.

Application filed June 7, 1926. Serial No. 114,209.

My invention relates to rim nuts for the valve stems of automobile tires and the object is to provide a simple, inexpensive and highly efficient rim nut the use of which reduces time and labor when putting tires on or taking them off of automobile wheels.

In the accompanying drawing:—

Figure 1:
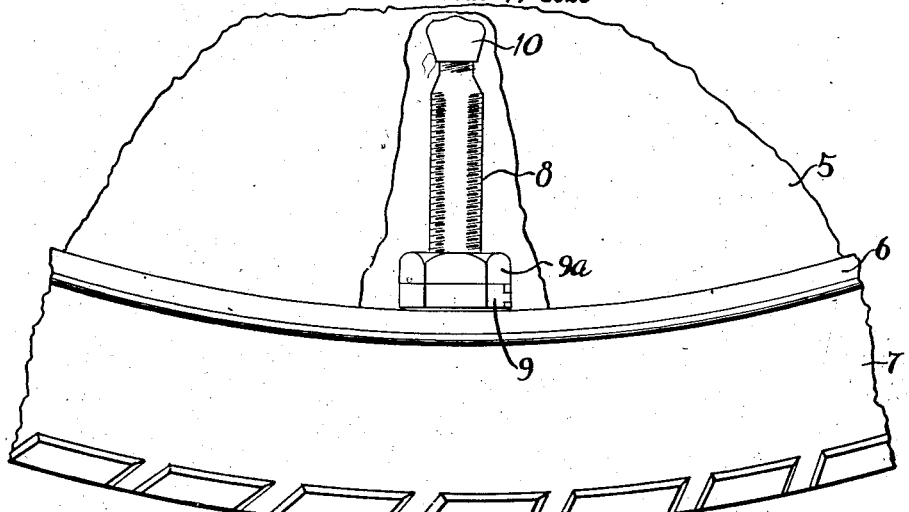
Fig. 1 is a side elevation of a portion of a tire and an automobile wheel of the disc type and my improved rim nut in operative position.
Figure 2:
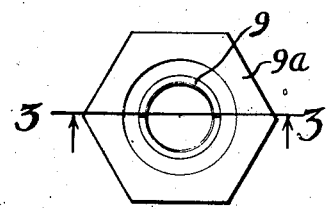
Fig. 2 is a top view of the nut members 9—9ª in Fig. 1.
Figure 4:
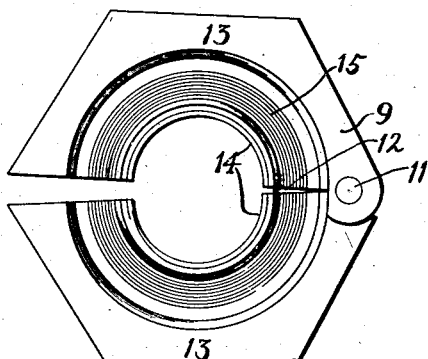
Fig. 4 is a top view of the lower nut member 9 in Fig. 3.

Referring to the drawing by reference numerals I have shown, in Fig. 1, a portion of an automobile wheel of the disc type having a web 5 combined with a felly and tire rim 6 for holding any suitable type of pneumatic tire 7, in the latter of which is the usual inner tube (not shown) having an inwardly and radially extending filler tube 8 with a nut 9 and a cap 10. This filler tube, usually known as the valve stem, contains the usual inside valve (not shown) for admitting and retaining air in the inner tube.

When a tire is to be removed from the wheel the valve stem 8 must of course go with it, requiring first the removal of nut 9. With the construction hitherto used such removal of the nut involves considerable time and effort since the valve stem is quite long and threaded its entire length and dirt, snow, ice or other matter may make its removal difficult.

Figure 3:
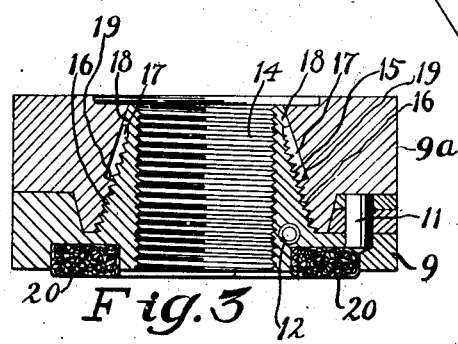
Fig. 3 is an enlarged section about as on the line 3—3 in Fig. 2.

The last mentioned difficulty I overcome by so constructing the nut that it may be spread and slipped over the top of the screw threads on the stem and then closed again when replaced on the valve stem threads near the rim 6 against which it is tightened in the usual manner. This construction of the nut consists of making it of two members, an inner member 9 and an outer member 9ª. The inner member is split diametrically into halves or jaws 13 which are pivoted together at 11 and have an inserted compression coil spring 12 tending at all times to spread the jaws away from the valve stem 8, which they normally engage by their inner threads 14. The jaws also have outer threads 15 on a cone shaped exterior. These threads are arranged to mesh with internal threads 16 of the lower portion of the outer member, said portion comprising an internal cone with said threads 16 in its wider part while its smaller part has no threads but forms a clearance 17 (see Fig. 3) for an enlargement or collar 18 of the inner member to move through until it stops against an internal shoulder 19 and thereby prevents separation of the two members when disengaged from the tube. 20 is the usual soft friction washer to prevent accidental rotation of the nut.

As previously implied, when the valve stem is to be removed with the tire the nut member 9ª is screwed upward a few turns allowing the jaws 13 to spread away from the stem which may thus be withdrawn and after the stem is replaced in the rim 6 the nut is pushed close to the felly and as its outer member is turned it closes the jaws 13 into the threads of the stem and the nut as a whole is then tightened against the washer 20.

What I claim is:

1. In combination with a valve stem of the class described, having external threads, of a jam nut threaded on the tube and composed of an inner and an outer member, the inner member being divided diametrically into halves and having, when closed together, a tapered threaded exterior, the other member being an integral ring with internally tapered threaded surface meshing with the outside threads of the inner member, said halves of the inner member being pivoted together so as to open and close, and a spring arranged to spread the halves.

2. The structure specified in claim 1, and means automatically preventing separation of the two nut members.

3. The structure specified in claim 1, and means automatically preventing separation of the two nut members, said means consisting of circular meeting shoulders one upon the outer side of the inner member and the other upon the inward side of the outer member.

In testimony whereof I affix my signature.

WALTER H. FLEMING.